(12) United States Patent
Tarleton et al.

(10) Patent No.: US 8,738,046 B2
(45) Date of Patent: May 27, 2014

(54) INTELLIGENT SHORT MESSAGE DELIVERY SYSTEM AND METHOD

(75) Inventors: Bryan Keith Tarleton, Buford, GA (US); Michael J. Criscolo, Alpharetta, GA (US)

(73) Assignee: Numerex Corp., Atlanta, GA (US)

( * ) Notice: Subject to any disclaimer, the term of this patent is extended or adjusted under 35 U.S.C. 154(b) by 998 days.

(21) Appl. No.: 12/290,048

(22) Filed: Oct. 27, 2008

(65) Prior Publication Data

US 2009/0318174 A1    Dec. 24, 2009

Related U.S. Application Data

(60) Provisional application No. 61/074,031, filed on Jun. 19, 2008.

(51) Int. Cl.
*H04W 4/00* (2009.01)
*H04W 40/00* (2009.01)
*H04L 12/58* (2006.01)
*H04M 11/00* (2006.01)

(52) U.S. Cl.
USPC ........ 455/466; 455/432.1; 455/433; 455/428; 455/412.1; 455/421

(58) Field of Classification Search
USPC ............ 455/466, 433, 412.1, 432.1, 428, 421
See application file for complete search history.

(56) References Cited

U.S. PATENT DOCUMENTS

| 6,208,870 B1* | 3/2001 | Lorello et al. ................. 455/466 |
| 6,370,390 B1 | 4/2002 | Salin et al. |
| 6,643,511 B1* | 11/2003 | Rune et al. .................... 455/433 |
| 7,145,875 B2 | 12/2006 | Allison et al. |
| 2005/0148350 A1* | 7/2005 | Kamphuis ...................... 455/466 |
| 2007/0254681 A1* | 11/2007 | Horvath et al. ................ 455/466 |
| 2007/0275741 A1* | 11/2007 | Bian et al. ..................... 455/466 |
| 2008/0004047 A1* | 1/2008 | Hill et al. ....................... 455/466 |

OTHER PUBLICATIONS

International Search Report, PCT/US2009/003646, Sep. 2, 2009, pp. 1-2.

* cited by examiner

*Primary Examiner* — Jinsong Hu
*Assistant Examiner* — Dung Hong
(74) *Attorney, Agent, or Firm* — King & Spalding (57) ABSTRACT

An intelligent short message system can provide an integrated home location register and short message service center (HLR/SMSC). Upon receiving an indication from a mobile switching center (MSC) that an SMS message could not be delivered to a destination device, the integrated HLR/SMSC prevents further retries from being attempted until the destination device becomes available again.

25 Claims, 5 Drawing Sheets

INTELLIGENT SHORT MESSAGE DELIVERY SYSTEM AND METHOD

PRIORITY APPLICATION

The present invention claims priority to U.S. Provisional Patent Application No. 61/074,031, filed on Jun. 19, 2008, the complete disclosure of which is hereby incorporated herein by reference.

TECHNICAL FIELD

The present invention relates generally to a system and method for intelligently exchanging short messages over a wireless network. More particularly described, the present invention comprises a functionally integrated home location register and short message service center, thereby allowing for intelligent short message delivery.

BACKGROUND

A conventional short message system (SMS) can transmit messages from one user to another. These SMS messages are transmitted over a network comprising several technological components. In a typical scenario, a sending device transmits the message. The system, in turn, transfers the message from one component or unit to another component or unit, until it is finally received by a destination device. In conventional SMS systems, a home location register (HLR) stores the last known location info of a destination device. In conventional SMS systems, however, situations may occur where the destination device is absent and the HLR is not notified. In this scenario, conventional SMS systems continuously attempt to deliver the SMS message to the destination device, despite the fact that the message cannot be delivered. Then, only after the destination device becomes available again (e.g., becomes available or moves to a different location), can the message be delivered. Accordingly, this "retry" process performed by conventional SMS systems consumes bandwidth in times that the message cannot otherwise be delivered.

Figure 1:
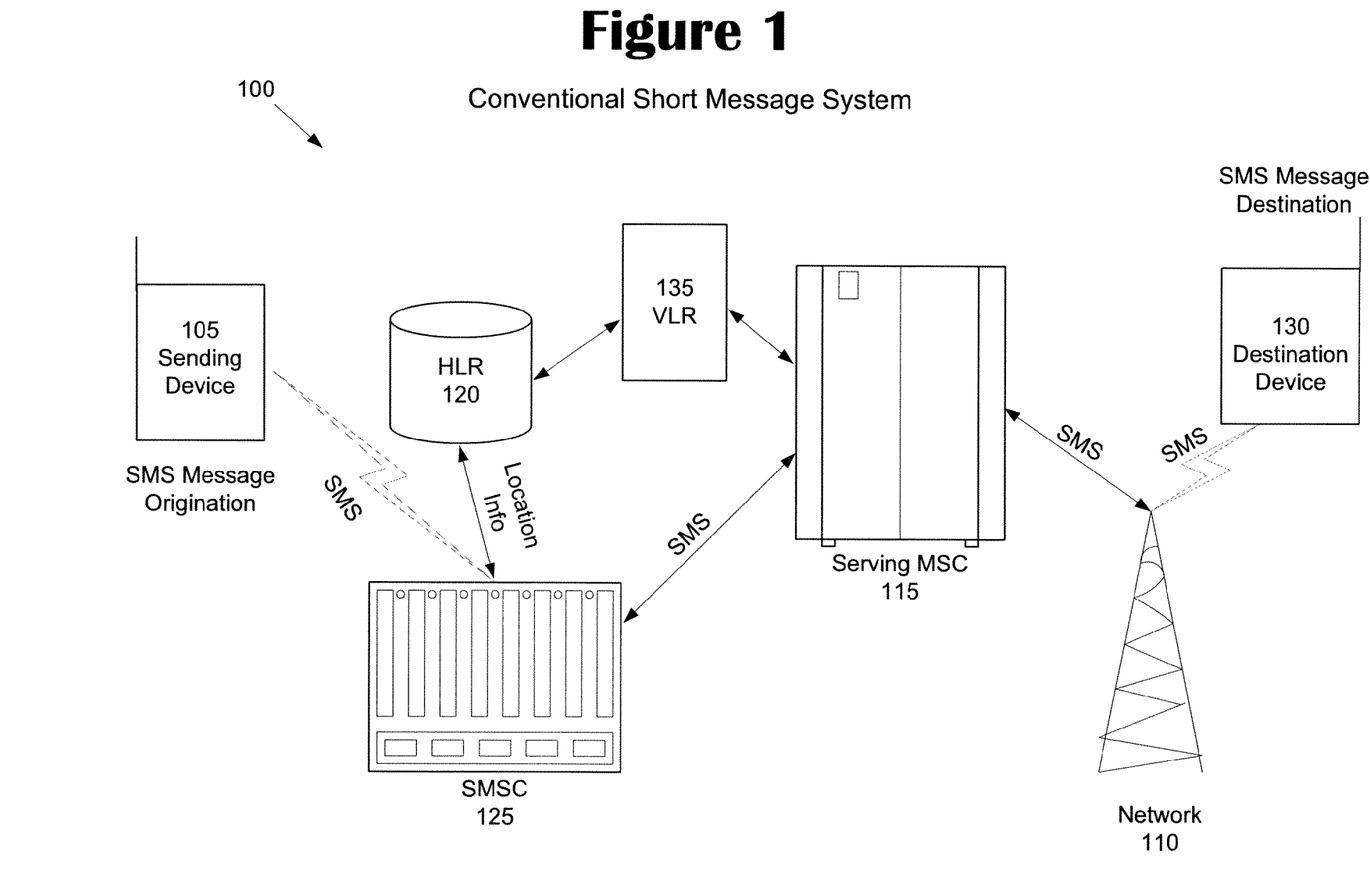
FIG. 1 is a functional overview of a conventional short message system.

FIG. 1 illustrates a conventional short message system. The system 100 may comprises a sending device 105, a short message service center (SMSC) 125, a home location register (HLR) 120, a visitor location register (VLR) 135, a serving mobile switching center 115, a network 110, and a destination device 130. Ordinarily, a SMS message may originate from the sending device 105 and end at the destination device 130. For example, a SMSC 125 may receive the message and query an HLR 120 for location info. Based on this location information received from the HLR 120, the SMSC 125 may proceed to forward the SMS message to a serving mobile switching center (MSC) 115 (as identified by the location info), whereby the message can ultimately be delivered to the destination device 130.

However, in the event the destination device 130 is unavailable, conventional SMS systems constrain signaling such that messages may be sent to devices that cannot receive them, resulting in retries that consume bandwidth. For example, if a destination device 130 resides in a coverage area of a remote VLR 135, but is unable to receive a SMS message, the message will propagate to the serving MSC 115 and, upon delivery failure, the MSC 115 will notify the SMSC 125 but not the HLR 120. While the SMSC 125 may report the failure back to the sending device 105, the next retry to send the message will result in the same sequence of events and use of bandwidth between the SMSC 125 and serving MSC 115. This retry is caused in part because, while a notification that the device is not present has been received by the SMSC 125, no such message has been sent to the HLR 120. Thus, the HLR 120 is unaware of the unavailability of the destination device 130. Accordingly, in conventional systems, the HLR database is not updated based on the SMS return codes. As a result, multiple reattempts may occur, each consuming network bandwidth.

For the above reasons, there currently exists a need in the art for a more effective system and method for conserving bandwidth in situations where a SMS message is undeliverable.

SUMMARY

An intelligent short message system can conserve bandwidth by preventing unnecessary retries when a SMS message is undeliverable. The intelligent short message system may comprise a functionally integrated home location registry and short message service center (HLR/SMSC). The functionally integrated HLR/SMSC may receive undeliverable message notices from the serving mobile switching center (MSC) for a particular destination device. Upon receiving this notice, the functionally integrated HLR/SMSC may send a notice to the visitor location register (VLR) associated with that MSC in order to cause the VLR to delete the destination device from its registry. Further, the functionally integrated HLR/SMSC will update its database and can withhold sending any further retries to the serving MSC until a confirmation has been received that the destination device is available again. Accordingly, when the destination device becomes available, the functionally integrated HLR/SMSC can forward the SMS message to the appropriate MSC for delivery to the destination device.

DETAILED DESCRIPTION OF THE EXEMPLARY EMBODIMENTS

An intelligent short message system can provide an efficient network solution for conserving bandwidth when a message is intended for an unavailable device. An exemplary embodiment of an intelligent short message system can integrate the functionality of a home location register (HLR) and a short message service center (SMSC) into a single entity, enabling intelligent retries. The functionally integrated HLR/SMSC can comprise a database and hardware, wherein a computer program may operate to perform the functions described herein. In this solution, the functionally integrated HLR/SMSC will recognize the unavailability of a destination device and will accordingly chose to withhold sending an SMS message across the network if the destination device is not available to receive it.

Figure 2:
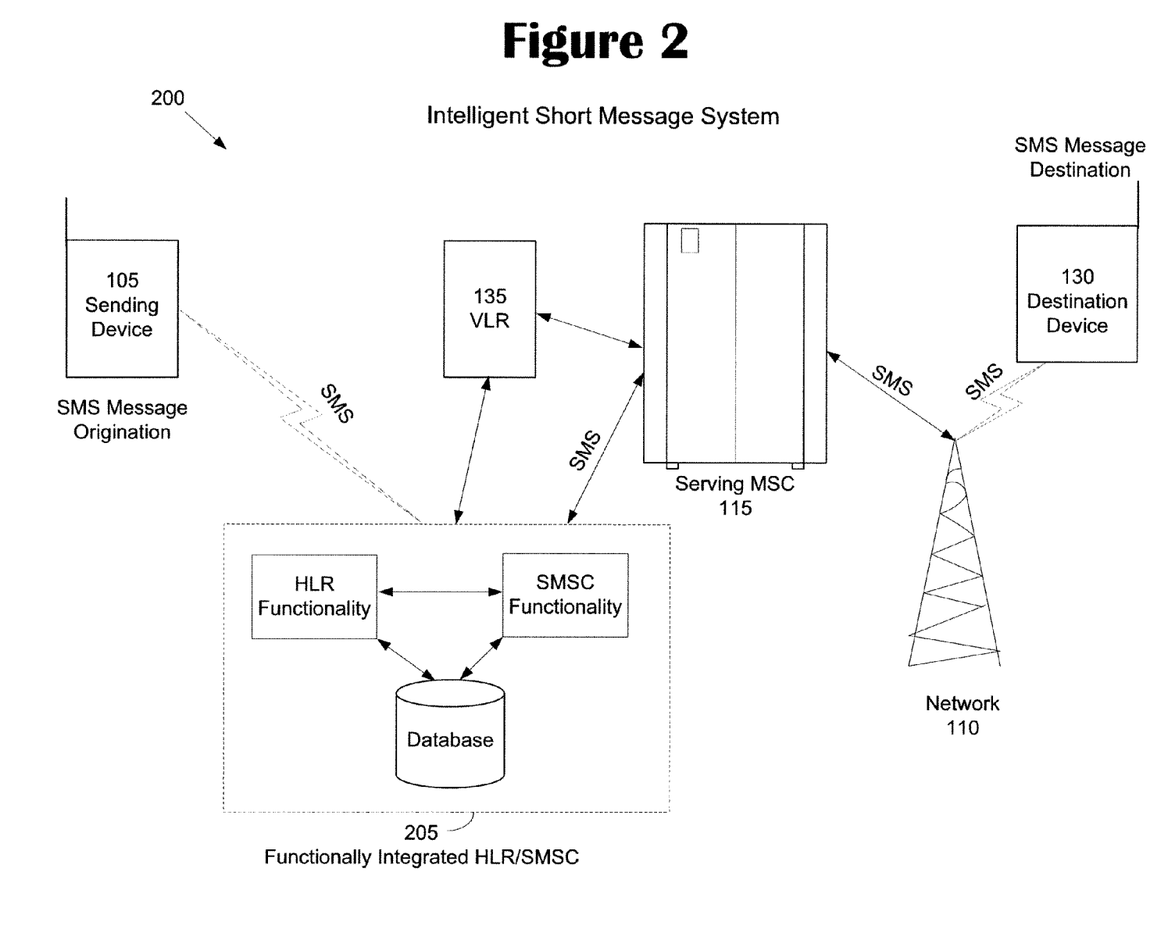
FIG. 2 is a logical overview of an intelligent short message system according to an exemplary embodiment of the present invention.

FIG. 2 illustrates an intelligent short message system 200 according to an exemplary embodiment of the present invention. As illustrated, the system 200 can comprise an functionally integrated HLR/SMSC 205. This functional integration may be achieved by assembling a computer database capable of performing functionality traditionally performed by an HLR and a SMSC independently. Normally, these devices are separate. To integrate the devices, in an exemplary embodiment, certain steps can be taken to fully integrate the functions of the two devices into a single unit. It is not required, however, that the HLR and SMSC be physically integrated. Accordingly, in one exemplary embodiment where the devices are only functionally integrated, the devices may remain separate, and computer processes can be developed to perform the functionalities associated with an HLR and an SMSC using inter-process communications, such that device status can be shared between the processes. The functionally integrated devices may communicate via any common communication protocol, such as Internet protocol or others. Additionally, the system can be designed to use a shared database that integrates the SMSC data with the HLR data, so that device status can be shared by the two processes performing the HLR and SMSC functions. The real time inter-process communications and the integrated database thereby functionally integrate the HLR and SMSC.

In a physical integration of an HLR and SMSC, a single device can be constructed that uses joint hardware, such as a single computer, to perform the functions of both the HLR and SMSC. A physical integration may also utilize a single database that is used to store data related to the functions of the physically integrated HLR/SMSC. In either integration, however, functional or physical, the steps as described herein may be performed to carry out the processes of the inventive integrated HLR/SMSC. Accordingly, the use of the term functionally integrated herein should also be interpreted to mean physically integrated and vice versa.

By integrating the functionality of the HLR and SMSC, bandwidth otherwise wasted by a SMSC 125 repeatedly attempting to send a message to an unavailable destination device 130 can be avoided. Specifically, this may be accomplished because the functionally integrated HLR/SMSC 205 receives the SMS delivery failure, thus allowing the functionally integrated HLR/SMSC to update the integrated HLR/SMSC database with the current status/location of the unavailable destination device. At the same time, the HLR/SMSC 205 may send a message to the serving VLR 135 ordering that the destination device 130 be deleted as an active unit (i.e., removed from the registry). Accordingly, when the destination device 130 reacquires the serving network, the serving VLR 135 will send a registration to the functionally integrated HLR/SMSC 205. The functionally integrated HLR/SMSC can then update the integrated HLR/SMSC database with the current status/location of the now available device and can either send a queued SMS message or inform the sending device 105 that the destination device 130 is available again to receive messages.

Figure 3:
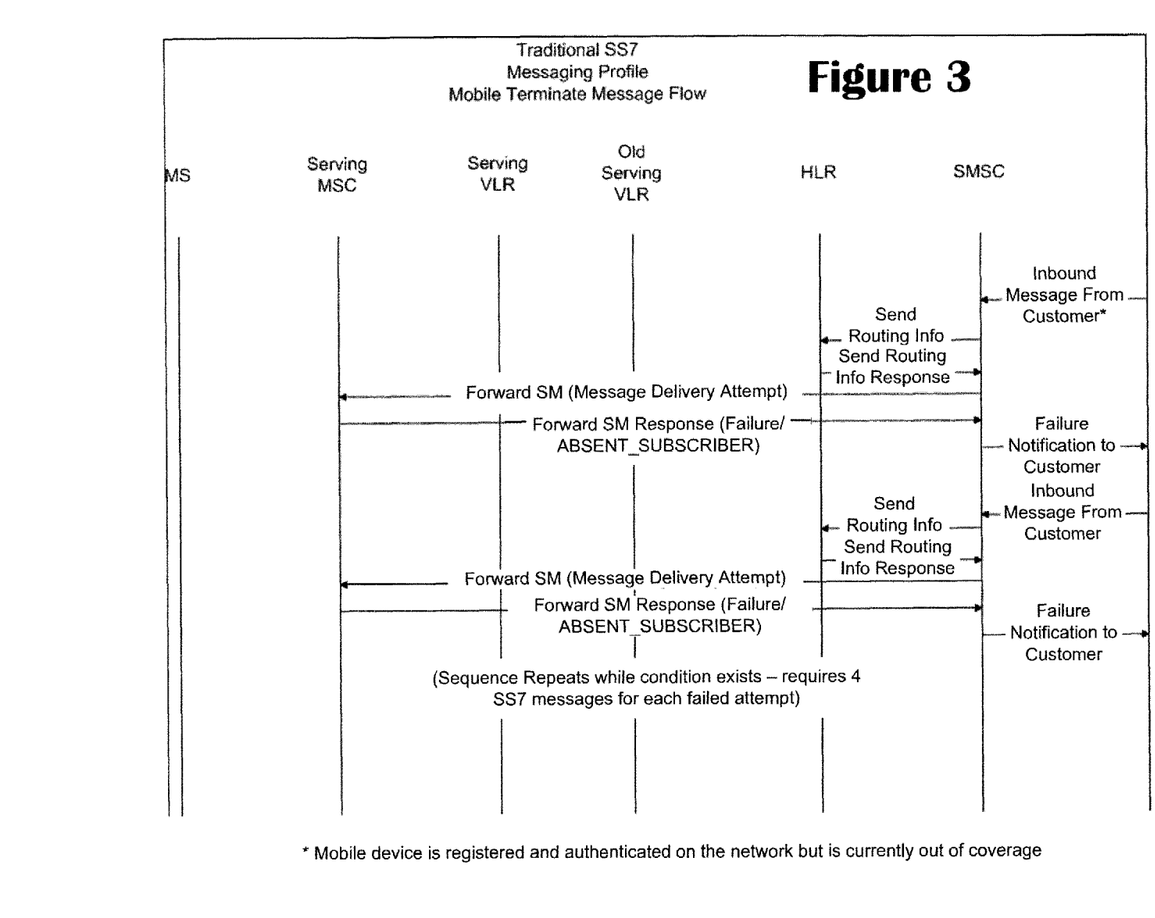
FIG. 3 is a ladder chart illustrating signal flows in a conventional short message system.

FIG. 3 is a ladder chart illustrating signal flows in a conventional short message system. As illustrated, an SMSC 125 receives an inbound message from a customer (e.g., from a sending device 105) and requests routing info from a HLR 120. Once the routing info is received at the SMSC 125, the SMSC 125 attempts to send the message to the serving MSC 115. If the message cannot be delivered, the MSC 115 will in turn send a response back to the SMSC 125 indicating that the message is undeliverable (i.e., the destination device 130 is unavailable). In this conventional system, however, the SMSC 125 does not update the HLR 120 with the failure information, typically only sending a failure notice to the sending device 105. For this reason, when prompted again, the SMSC 125 will check with the HLR 120 for the location of the destination device 130 and will again receive information that the destination device 130 is available through a certain MSC 115. The SMSC 125 will then retry sending the SMS message to the MSC 115. This process will continue until it terminates after a specified amount of time, or the destination device 130 becomes available again, or the serving VLR proactively cleans up its database and notifies the HLR that the device is no longer on the network.

As illustrated, because the HLR 120 is not updated to reflect the unavailable destination device 130, the process repeats continuously, with the inbound message being re-sent to the SMSC 125, the SMSC 125 requesting information about the location of the destination device from the HLR 120, the SMSC forwarding the message to the MSC 115, and the MSC 115 returning a failure notification to the SMSC 125. Accordingly, the conventional process wastes valuable network bandwidth trying to send the SMS message to an unavailable destination device 130.

Figure 4:
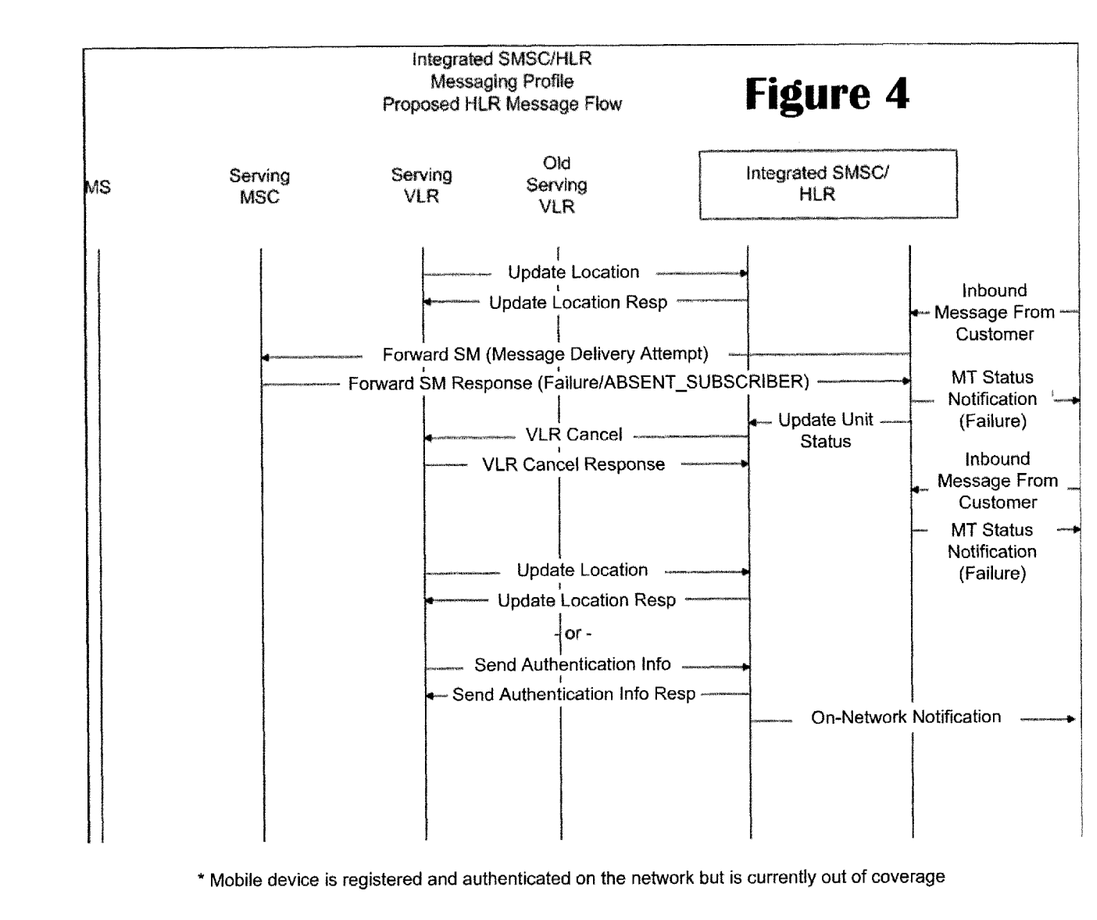
FIG. 4 is a ladder chart illustrating signal flows in an intelligent short message system according to an exemplary embodiment of the present invention.

FIG. 4 is a ladder flow chart illustrating signal flows for an intelligent short messaging system 200 according to an exemplary embodiment of the invention. As illustrated, the function of a HLR and a SMSC can be integrated in the intelligent short message system to create a functionally integrated HLR/SMSC 205. An inbound message can be received from a sending device 105 (i.e., customer) at the integrated HLR/SMSC 205. Because the functionality of the two components (HLR and SMSC) are combined, the functionally integrated unit 205 does not need to perform a separate step to receive the location of the destination device 130. Thus, the functionally integrated HLR/SMSC 205 efficiently determines the location of the destination device 130 and forwards the SMS message for delivery to the serving MSC 115. In the event the SMS message is undeliverable, the functionally integrated HLR/SMSC 205 receives a message from the serving MSC 115 indicating the failure. The functionally integrated HLR/SMSC 205 can then send a failure notification back to the customer. However, because the HLR and SMSC are integrated, the HLR/SMSC 205 can also update its database to reflect that the destination device is unavailable. Further, to ensure that the VLR 135 notifies the functionally integrated HLR/SMSC 205 when the device is available to receive messages again, the integrated HLR/SMSC 205 sends a cancel request to the VLR 135 to delete the destination device from the VLR's registry.

Due to the integrated functionality of the HLR/SMSC 205, further attempts by the sending device 105 (i.e., customer) to re-send the message will be terminated at the integrated HLR/SMSC 205 (assuming the destination device remains unavailable), instead of using bandwidth to send the message to the MSC 115 and receive a failure response. Further, when the destination device becomes available, the VLR 135 may send an update location request or an authentication notifying the functionally integrated HLR/SMSC 205 that the destination device has become available. At that time, the functionally integrated HLR/SMSC 205 can send a notification to the sending device 105 that the destination device 130 is on-network and is ready to receive the SMS message.

After the functionally integrated HLR/SMSC 205 again receives the SMS message from the sending device 105 (or in an alternative embodiment, if the functionally integrated HLR/SMSC 205 has stored the message in queue for later delivery), the functionally integrated HLR/SMSC 205 will proceed to deliver the message to the serving MSC 115 for delivery to the destination device 130. The serving MSC then delivers the message to the available destination device 130. Accordingly, because the functionally integrated HLR/SMSC 205 waits until the destination device is identified as being available before forwarding the SMS message back to a serving MSC 115, network bandwidth is saved.

Figure 5:
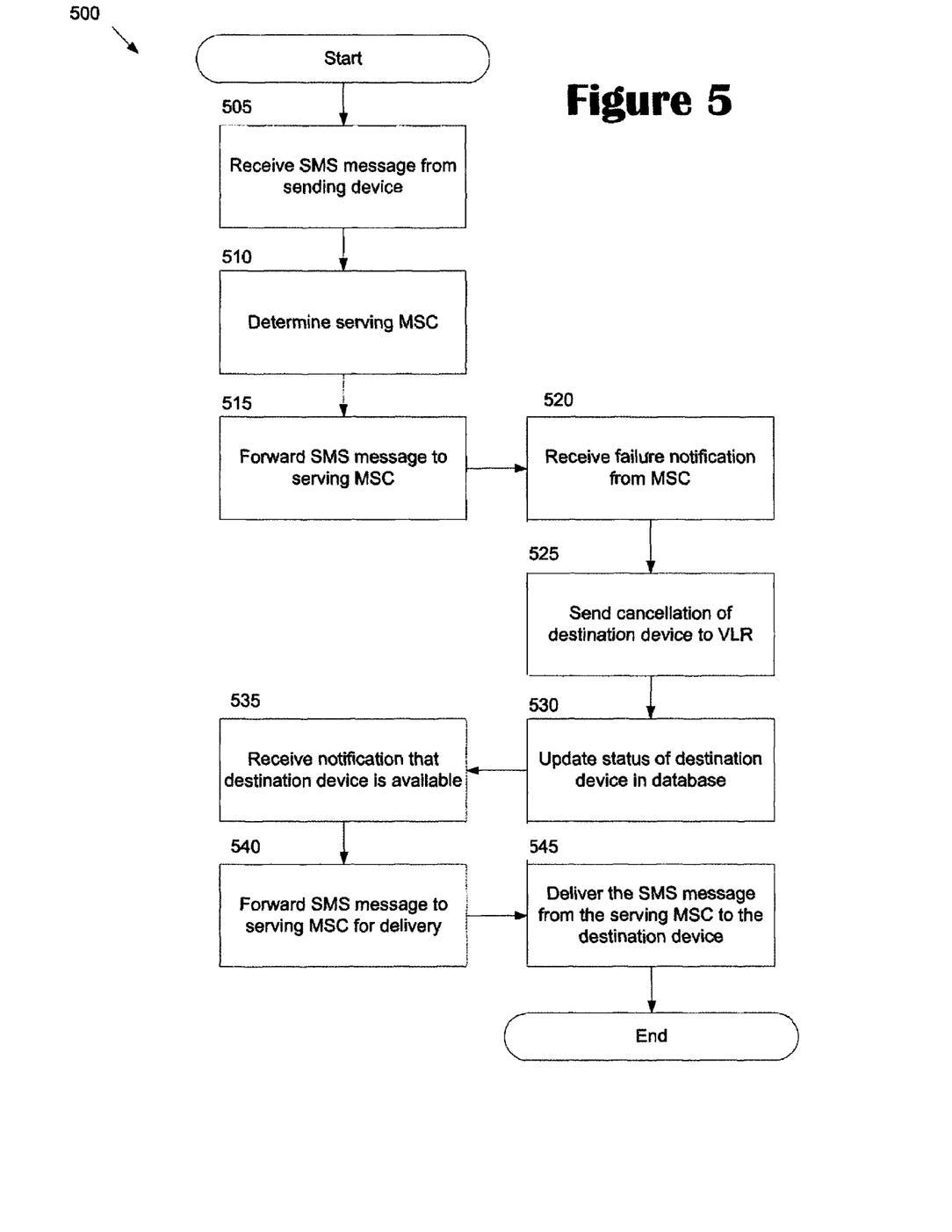
FIG. 5 is a logical flow chart illustrating the implementation of a functionally integrated HLR/SMSC according to an exemplary embodiment of the present invention.

FIG. 5 is a flow chart illustrating a method of implementing an intelligent short message system 200 according to an exemplary embodiment of the present invention. The process begins at the START step and continues to Step 505, where an integrated HLR/SMSC 205 receives a SMS message from a sending device 105. The HLR/SMSC 205 references a database to determine where the SMS message should be sent to reach the destination at Step 510. That is, the requirement of referencing a separate HLR 120 can be avoided by using the intelligent short message system 200. For example, because the HLR and SMSC functions are combined in the functionally integrated HLR/SMSC 205, the information typically stored at the HLR 120 describing the location of the destination device 130 is accessible by the SMSC-functionality contained in the functionally integrated HLR/SMSC 205. At Step 515, based on the forwarding information retrieved, the HLR/SMSC 205 can send the SMS message to the serving MSC 115 where the destination device is located. If the destination device is present and can receive the message, it will be delivered. Otherwise, if the message is undeliverable, a failure notification is sent back and received at the HLR/SMSC 205 from the serving MSC 115 at Step 520.

Based on the failure notice, the HLR/SMSC 205 is aware that the destination device 130 is unavailable and, therefore, will not forward any further messages to the serving MSC 115 intended for the destination device 130. However, to ensure that the HLR/SMSC 205 is notified when the destination device 130 becomes available again, the integrated unit 205 sends a cancellation request to the VLR 135 at Step 525. Then, at Step 530, the integrated HLR/SMSC 205 updates its status to recognize that the destination device is unavailable. For example, the HLR/SMSC 205 may store the status of the destination device in a database as unavailable. Accordingly, any further attempts by a sending device 105 to reach the destination device 130 will be stopped at the HLR/SMSC 205 without further bandwidth usage because the functionally integrated HLR/SMSC 205 has recorded the destination device as being unavailable. The HLR/SMSC 205 can in turn immediately send a notification of unavailability back to the sending device 105 instead of wasting network resources by forwarding the SMS message to the serving MSC 115 (and in turn receiving a failure notification back from the serving MSC 115).

Because the status of the destination device 130 is stored as unavailable, further attempts to send the message to the destination device 130 will be terminated at the integrated HLR/SMSC 205 (i.e., the HLR/SMSC 205 will recognize that the device is unavailable and will not forward it to the serving MSC 115). However, when the destination device 130 becomes available again, a visitor location register (VLR) 135 or a serving mobile MSC 115 may notify the functionally integrated HLR/SMSC 205 of the destination device's 130 availability at step 535. In one exemplary embodiment, this process may be performed because the entry for the destination device 130 has been deleted in the VLR 135, as illustrated in step 525. However, regardless of the reason, upon receiving the notification that the destination device 130 is available again, the HLR/SMSC 205 can update its records (i.e., update the database entry) to signify that the destination device is available, as illustrated at step 530. In this way, the SMS message may be forwarded directly from the functionally integrated HLR/SMSC 205 (if the SMS message has been stored in a queue at the HLR/SMSC awaiting delivery), or the HLR/SMSC 205 may notify the sending device 105 of the destination device's 130 availability such that the SMS message can be resent. In either case, as illustrated at step 540, once the destination device 130 becomes available again, the SMS message may be forwarded from the functionally integrated HLR/SMSC 205 to the serving MSC 115 for ultimate delivery to the destination device 130. Then, at step 545, the serving MSC 115 may deliver the SMS message to the destination device 130.

As described above, the integrated HLR/SMSC, according to an exemplary embodiment at step 525, also sends a cancellation request to the host VLR 135 when it receives a failure notification from a serving MSC 115. The VLR 135, upon receiving the cancellation request, can then delete the destination device from its registry. Accordingly, when the destination device 130 becomes available again, the VLR 135 will know to send an update to the integrated HLR/SMSC 205 notifying it that the message can be delivered.

The foregoing description of the exemplary embodiments of the intelligent short message system has been presented for the purposes of illustration and description only, and is not intended to be exhaustive or the limit the invention to the precise embodiments disclosed. Many modifications and variations are possible in light of the above teachings and fall within the spirit and scope of the present invention. The embodiments described herein were chosen in order to explain the principles of the intelligent short message system and their practical application so as to enable others skilled in the art to use the invention in various embodiments and with various modifications suited to their particular use.

We claim:

1. A method for intelligently transmitting a short message system (SMS) message to a destination device, the method comprising the steps of:
   at a functionally integrated home location register and short message service center (HLR/SMSC), receiving the SMS message from a sending device;
   at the functionally integrated HLR/SMSC, determining a serving mobile switching center (MSC) to which the SMS message should be forwarded;
   forwarding the SMS message to the serving MSC;
   at the functionally integrated HLR/SMSC, in response to forwarding the SMS message to the serving MSC, receiving a failure notification from the serving MSC;
   in response to receiving the failure notification, updating an integrated HLR/SMSC database at the functionally integrated HLR/SMSC to reflect a status of the destination device to prevent additional delivery attempts to the destination device until the status changes;
   in response to the status changing, attempting a delivery attempt to the destination device; and
   sending a message to a serving visitor location register (VLR) instructing the serving VLR to cancel the destination device from the records of the serving VLR, wherein canceling the destination device ensures that the serving VLR notifies the functionally integrated HLR/SMSC when the destination device is available to receive the SMS message, thereby conserving network bandwidth by preventing additional attempts to deliver the SMS message to a destination device when the destination device is unavailable to receive the SMS message.

2. The method of claim 1, further comprising the step of notifying the sending device of the status of the destination device.

3. The method of claim 1, wherein upon receiving an updated status of the destination device from a serving visitor location register (VLR), the SMS message is delivered to the destination device.

4. The method of claim 3, wherein upon receiving another attempt to forward the SMS message to the destination device, immediately notifying the sending device that the destination device is unavailable.

5. The method of claim 1, further comprising the step of forwarding the SMS message to a serving MSC only upon receiving a notification that the destination device is available to receive the SMS message.

6. The method of claim 1, wherein the message is forwarded to the serving MSC only when the database reflects that the destination device is available.

7. The method of claim 1, further comprising the steps of:
   receiving a registration notification from the serving MSC that the destination device is available;
   updating the status of the destination device; and
   forwarding the SMS message to the serving MSC for delivery to the destination device.

8. An intelligent SMS system, comprising a functionally integrated home location register and short message service center (HLR/SMSC) configured to perform the following functions:
   receive an SMS message from a sending device for delivery to a destination device;
   determine a serving mobile switching center (MSC) where the sending device is registered;
   forward the SMS message to the serving MSC;
   receive a delivery failure notification from the serving MSC;
   update an integrated HLR/SMSC database to reflect that the destination device is unavailable to prevent additional delivery attempts to the destination device;
   receive a registration notification from the serving MSC that the destination device is available;
   update the integrated HLR/SMSC database to reflect that the destination device is available;
   forward the SMS message to the serving MSC for delivery to the destination device; and
   send a message to a serving visitor location register (VLR) to cancel the destination device from the records of the serving VLR, wherein canceling the destination device ensures that the serving VLR notifies the functionally integrated HLR/SMSC when the destination device is available to receive the SMS message, thereby conserving network bandwidth by preventing additional attempts to deliver the SMS message to a destination device that is unavailable to receive the SMS message.

9. The intelligent SMS system of claim 8, wherein the functionally integrated HLR/SMSC is further configured to notify the sending device of the status of the destination device.

10. The intelligent SMS system of claim 8, wherein upon receiving another attempt to forward the SMS message to the destination device, the functionally integrated HLR/SMSC automatically sends a failure notification to the sending device based on the unavailability of the destination device.

11. The intelligent SMS system of claim 8, wherein upon receiving another attempt to forward the SMS message to the destination device, the functionally integrated HLR/SMSC performs the steps of:
   checking the availability of the destination device by referencing the integrated HLR/SMSC database; and
   if the destination device is recorded in the integrated HLR/SMSC database as being unavailable, immediately notifying the sending device that the destination device is unavailable.

12. The intelligent SMS system of claim 8, wherein the functionally integrated HLR/SMSC is further configured to forward the SMS message to a serving MSC only when the integrated HLR/SMSC database does not list the destination device as being unavailable.

13. The intelligent SMS system of claim 8, wherein the functionally integrated HLR/SMSC is further configured to store the SMS message in a queue and forward the SMS message to a serving MSC upon receiving a notification that the destination device is available to receive the SMS message.

14. A functionally integrated home location register and short message service center (HLR/SMSC) comprising:
   an integrated HLR/SMSC database; and
   a processor, wherein the processor is configured to perform the steps of:
      receiving an SMS message from a sending device for delivery to a destination device;
      determining a serving mobile switching center (MSC) to forward the received SMS message;
      forwarding the SMS message to the serving MSC;
      responsive to forwarding the received SMS message to the serving MSC, receiving a failure notification from the serving MSC;
      updating the integrated HLR/SMSC database to reflect status of the destination device with respect to the received failure notification to prevent additional delivery attempts to the destination device; and
      sending a message to a serving visitor location register (VLR) to cancel the destination device from active records of the serving VLR, wherein canceling the destination device ensures that the serving VLR notifies the functionally integrated HLR/SMSC when the destination device is available to receive the SMS message, thereby conserving network bandwidth by preventing additional delivery attempts to deliver the SMS message to a destination device that is unavailable to receive the SMS message.

15. The functionally integrated HLR/SMSC of claim 14, wherein the processor further performs the step of notifying the sending device of the status of the destination device.

16. The functionally integrated HLR/SMSC of claim 14, wherein upon receiving another attempt to forward the SMS message to the destination device, the processor further performs the step of automatically sending a failure notification to the sending device.

17. The functionally integrated HLR/SMSC of claim 14, wherein upon receiving another attempt to forward the SMS message to the destination device, the processor further performs the step of immediately notifying the sending device that the destination device is unavailable.

18. The functionally integrated HLR/SMSC of claim 14, wherein the processor further performs the step of forwarding the SMS message to a serving MSC only upon receiving a notification that the destination device is available to receive the SMS message.

19. The functionally integrated HLR/SMSC of claim 14, wherein upon receiving an updated status of the destination device from a serving visitor location register (VLR), the SMS message is delivered to the destination device.

20. A method for intelligent delivery of short messages, comprising:

providing a functionally integrated home location register and short message service center (HLR/SMSC) comprising:
- a home location register (HLR);
- a short message service center (SMSC) linked to the HLR; and
- an integrated HLR/SMSC database linked to the HLR and the SMSC;

at the functionally integrated HLR/SMSC, obtaining a failure result from a message delivery attempt by the SMSC for a destination device;

at the functionally integrated HLR/SMSC, using the obtained failure result to update status of the destination device so subsequent queries return that the destination device is unavailable for message receipt; and at the functionally integrated HLR/SMSC, sending a message to a serving visitor location register (VLR) instructing the serving VLR to cancel the destination device from active records of the serving VLR, wherein canceling the destination device ensures that the serving VLR notifies the functionally integrated HLR/SMSC when the destination device is available to receive an SMS message, thereby conserving network bandwidth by preventing additional attempts to deliver the SMS message to a destination device when the destination device is unavailable to receive the SMS message.

21. The method of claim 20, wherein the HLR and the SMSC are physically integrated into a single computer system.

22. The method of claim 21, wherein the functionally integrated HLR/SMSC comprises a physically integrated HLR/SMSC with a single computer performing HLR and SMSC functions, and wherein the integrated HLR/SMSC database comprises a single database storing data relating to functions of the physically integrated HLR/SMSC.

23. A method for intelligent delivery of short messages, comprising:

providing a functionally integrated home location register and short message service center (HLR/SMSC) comprising:
- a home location register (HLR);
- a short message service center (SMSC) in communication with the HLR; and
- an integrated HLR/SMSC database in communication with the HLR and the SMSC;

at the functionally integrated HLR/SMSC, evaluating a result of an unsuccessful short message service (SMS) delivery attempt to a destination device; and responsive to the evaluation, at the functionally integrated HLR/SMSC, providing notification from the SMSC to the HLR that the destination device is no longer at a last known location; and at the functionally integrated HLR/SMSC, sending a message to a serving visitor location register (VLR) instructing the serving VLR to cancel the destination device from records of the serving VLR, wherein canceling the destination device ensures that the serving VLR notifies the functionally integrated HLR/SMSC when the destination device is available to receive an SMS message, thereby conserving network bandwidth by preventing additional attempts to deliver the SMS message to a destination device when the destination device is unavailable to receive the SMS message.

24. The method of claim 23, wherein the HLR and the SMSC are physically integrated into a single computer system.

25. The method of claim 23, wherein the functionally integrated HLR/SMSC comprises a physically integrated HLR/SMSC with a single computer performing HLR and SMSC functions, and wherein the integrated HLR/SMSC database comprises a single database storing data relating to functions of the physically integrated HLR/SMSC.

* * * * *